United States Patent [19]

Stolz et al.

[11] 4,397,966

[45] Aug. 9, 1983

[54] ALKYLENE OXIDE ADDUCTS OF VICINAL TOLUENEDIAMINE

[75] Inventors: Theodore O. Stolz, Detroit; Richard A. Moore; James P. Lutz, both of Trenton, all of Mich.

[73] Assignee: BASF Wyandotte Corporation, Wyandotte, Mich.

[21] Appl. No.: 326,299

[22] Filed: Dec. 1, 1981

[51] Int. Cl.$^3$ .............................................. C08G 18/14
[52] U.S. Cl. .................................... 521/167; 252/182; 564/399
[58] Field of Search ........................ 564/399; 252/182; 521/167

[56] References Cited

U.S. PATENT DOCUMENTS 3,446,848 5/1969 Aitken et al. ........................ 260/584
4,085,140 4/1978 Ibbotson et al. .................... 260/566

FOREIGN PATENT DOCUMENTS 1510424 5/1978 United Kingdom .

Primary Examiner—Maurice J. Welsh
Attorney, Agent, or Firm—David L. Hedden; Joseph D. Michaels

[57] ABSTRACT

The subject invention relates to polyol compositions which are alkylene oxide adducts of a mixture of initiators comprising vicinal toluenediamine and an initiator selected from the group consisting of ammonia, an aliphatic amine having a molecular weight of from 20 to 120, an alkanolamine having a molecular weight of from 50 to 120, and mixtures thereof. Low molecular weight diols may also be used as a co-initiator in combination with ammonia, an aliphatic amine, an alkanolamine, or mixtures thereof.

The subject polyol compositions are particularly useful in the preparation of rigid polyurethane foams.

27 Claims, No Drawings

ALKYLENE OXIDE ADDUCTS OF VICINAL TOLUENEDIAMINE

BACKGROUND OF THE INVENTION

1. Field of the Invention

The subject invention relates to polyol compositions which are alkylene oxide adducts of vicinal toluenediamine and another initiator selected from the group consisting of ammonia, an aliphatic amine, an alkanolamine, and mixtures thereof. The subject polyol compositions are particularly useful in the preparation of rigid polyurethane foams.

2. Description of the Prior Art

It is known that alkylene oxide adducts of various initiator compounds containing two or more active hydrogen atoms, as determined by the Zerewitinoff test, are useful in the preparation of polyurethane foams. It is also known that in order to prepare rigid polyurethane foams, the alkylene oxide adducts must have low equivalent weights and high hydroxyl numbers such as 300-600. In order to prepare such adducts, initiator compounds are used which have higher functionalities, i.e., from 4-8. Moreover the amount of alkylene oxide used is less than that which would be used for preparing flexible polyurethane foams.

It is known that 2,4-toluenediamine, 2,6-toluenediamine, and mixtures thereof can be used as initiators for the preparation of alkylene oxide adducts which can be used to prepare rigid polyurethane foams. In particular, a mixture of toluenediamine isomers consisting of about 80 percent by weight of 2,4-toluenediamine and 20 percent by weight of 2,6-toluenediamine (hereinafter referred to as 80/20 toluenediamine) has been used as an initiator compound.

One of the problems, however, associated with the use of 80/20 toluenediamine is that the resulting alkylene oxide adducts have viscosities which make them difficult to handle and process. One way of reducing the viscosity of the adduct is to use ethylene oxide rather than propylene oxide. Another way of reducing the viscosity is to first react the 80/20 toluenediamine with ethylene oxide to form an intermediate adduct and react this intermediate with propylene oxide.

Although these techniques will reduce the viscosity, there is still a need to develop more effective techniques of reducing the viscosity of toluenediamine adducts in order to reduce the expense and problems associated with using such adducts.

SUMMARY OF THE INVENTION

The subject invention relates to polyol compositions which are alkylene oxide adducts of a mixture of initiators comprising vicinal toluenediamine and an initiator selected from the group consisting of ammonia, an aliphatic amine having a molecular weight of from 20 to 120, an alkanolamine having a molecular weight of from 50 to 120, and mixtures thereof.

The subject polyol compositions have viscosities as low as 18,000 cps at 25° C. when as little as 10 parts by weight, based upon 100 parts of initiator mixture, of the initiator other than vicinal toluenediamine are present.

The comparative examples herein, which show the viscosities of blends corresponding to the subject polyol compositions and which show the viscosities for products analogous to the subject polyol compositions but using 80/20 toluenediamine as the co-initiator instead of vicinal toluenediamine, demonstrate that the magnitude of the improvement in the viscosities of the subject polyol compositions could not have been predicted.

The subject polyol compositions are particularly useful in the preparation of rigid polyurethane foams.

DESCRIPTION OF THE PREFERRED EMBODIMENT

The general procedure for preparing the subject polyol compositions is well known to those skilled in the art. The vicinal toluenediamine and other initiator are charged to a reaction vessel, preferably along with an alkoxylation catalyst. The reaction vessel is then heated to increased temperatures such as 110° C. to 160° C. and the alkylene oxide is added either in one step or multiple steps and allowed to react for approximately 5 to 15 hours. The precautions which are needed and the specific equipment which is used is well known to those skilled in the art.

For purposes of the subject invention, the term "vicinal toluenediamine" includes 2,3-toluenediamine and 3,4-toluenediamine, and mixtures thereof. Other isomers of toluenediamine, such as 2,4-toluenediamine and 2,6-toluenediamine may also be present providing they are not present in quantities of more than 20 percent by weight based upon the total weight of toluenediamine isomers.

Particularly useful as the vicinal toluenediamine initiator is a mixture containing 90 percent by weight of an approximately 1:1 weight ratio of 2,3-toluenediamine and 3,4-toluenediamine, and 10 percent by weight of 80/20 toluenediamine (hereinafter referred to as 90/10 toluenediamine).

Suitable co-initiators which can be used with the vicinal toluenediamine are compounds selected from the group consisting of ammonia, an aliphatic amine having a molecular weight of from 20 to 120, an alkanolamine having a molecular weight of from 50 to 120, and mixtures thereof. Preferably used as the aliphatic amine is ethylenediamine. Preferably used as the alkanolamine are monoethanolamine, diethanolamine, and triethanolamine. The weight ratio of vicinal toluenediamine to other initiators is from 5:1 to 50:1, preferably from 6:1 to 9:1.

Alkylene oxides used in the subject invention are ethylene oxide, propylene oxide, and mixtures thereof. In order to prepare rigid polyurethane foams, sufficient alkylene oxide is added to the initiator mixture to result in a polyol having a hydroxyl number of 300-600. Generally, from about 5 to 10 moles of alkylene oxide are used per mole of initiator.

As was mentioned, the reaction preferably is carried out in the presence of an alkoxylation catalyst. Any alkoxylation catalyst known in the art can be employed for this purpose. Examples of such catalysts are tertiary amines such as pyridine, triethylamine and the like, alkali metals such as sodium, potassium, and lithium and alkali metal hydroxides such as sodium hydroxide, potassium hydroxide, lithium hydroxide, and the like.

The amount of alkoxylation catalyst employed in the above process is generally within the range of about 0.0001 to about 1 part by weight of catalyst per 100 parts by weight of amine.

In one of the preferred embodiments of the subject invention, 90/10 toluenediamine is mixed with ethylenediamine such that the weight ratio of 90/10 toluenediamine to ethylenediamine is from 5:1 to 50:1, preferably 5:1 to 10:1. The alkylene oxide is added in two steps such that from 1-5 moles of ethylene oxide is added in the first step per mole of initiator and from 1-5 moles of propylene oxide are added in the second step, with the proviso that the total amount of alkylene oxide added is such that the polyol composition will have a hydroxyl number of 400 to 550. Such polyols are particularly useful for preparing foams to be used in lamination products.

In another preferred embodiment of the invention 90/10 toluenediamine is mixed with ethylenediamine and propylene glycol such that the weight ratio of toluenediamine to ethylenediamine to propylene glycol is from 50:1:1 to 50:5:5, preferably 40:3:2 to 42:3:2. The alkylene oxide added is a mixture of ethylene oxide and propylene oxide and is an amount sufficient to result in a polyol composition having a hydroxyl number of 350-450. The weight ratio of ethylene oxide to propylene oxide is from 1:2 to 2:1, preferably about 1:1.5. Such polyol compositions are particularly useful for preparing foams which are used as insulation in appliances because foam formulations containing these polyol compositions have improved flowability.

The methods utilized for preparing polyurethane foams from the subject polyols are well known to those skilled in the art. As was previously indicated, the polyols are particularly useful for the preparation of rigid foams. In such applications their hydroxyl numbers generally are in the range of 300 to 600. The subject polyols may be used alone or blended with other polyols.

Polyurethane foams are prepared from the subject polyols, or blends of the subject polyols and customarily used polyols, by reacting them with an organic polyisocyanate in the presence of a blowing agent. Organic polyisocyanates which can be used to prepare the polyurethane foams are those customarily used and may be represented by the following formula:

where R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4',4"-tri-phenylmethane triisocyanate, 2,4,6-toluene triisocyanates; aromatic tetraisocyanates such as 4,4'-dimethyldiphenylmethane-2,2',5,5'-tetraisocyanate, and the like; aralkyl polyisocyanates such as xylyene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the usable isocyanates are modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

As was indicated previously, the organic polyisocyanate is reacted with the subject polyols or blends of the subject polyols and polyols customarily used. By "polyols customarily used" is meant polyols which generally have an equivalent weight of from 50 to 300 and an average functionality of from 2 to 6. The amount of these polyols used is such that from 10 to 90 parts by weight are present per 100 parts of polyol blend. Suitable polyols include: hydroxyl-terminated polyesters; polyoxyalkylenepolyether polyols; alkylene oxide adducts of organic compounds having at least 2 reactive hydrogen atoms such as amines, and thiols; and hydroxy-terminated acetals.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. The polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re 28,715), 3,304,273, 3,652,639, and 3,823,201 (Re 29,014).

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two —SH groups such as 1,2-ethanedithiol, 1,2-proanedithiol, 1,3-propanedithiol, and 1,6-hexanedithiol; and alkanethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

In order to prepare a rigid polyurethane foam, the organic polyisocyanate is reacted with the polyol component in the presence of a blowing agent and preferably a catalyst such that the ratio of isocyanate groups of the organic polyisocyanate to active hydrogens of the polyol ranges from 1:0.9 to 1:1.15.

Blowing agents which are employed in the present invention are well known to those skilled in the art. Representative blowing agents include water, fluorocarbons such as trichloromonofluoromethane, 1,1,1-trichloro-2,2,2-trifluoroethane, tetrafluoromethane, bromotrifluoromethane, chlorotrifluoromethane, dibromodifluoromethane, trichlorethylene, chloroform, carbon tetrachloride and low boiling hydrocarbons such as butane, pentane and hexane. Included are the blowing agents disclosed in U.S. Pat. No. 3,922,238.

Catalysts are also preferably employed. Catalysts which may be used include organometallic catalysts such as dibutyltin dilaurate, dibutyltin dioctoate, stannous dioctoate, lead octoate, and cobalt naphthenate; tertiary amine catalysts such as, triethylenediamine, 1,3,5-tris(3-dimethyaminopropyl)-s-hexahydrotriazine; and other catalysts customarily used in the preparation of polyurethane foams.

Other additives may also be included in the foam formulations. Included are surfactants such as the silicone surfactants, e.g., polyoxyalkylene-polyalkylsiloxane, and flame retardants such as tris(2-chloroethyl)-phosphate.

The examples which follow will provide detailed descriptions of how to make and use the subject polyols, but are not intended to limit the scope of the invention. The parts referred to in the examples are by weight and the temperatures are in degrees centigrade unless otherwise designated. The following abbreviations are used in the examples:

80/20 TDA—a mixture of toluenediamine isomers containing 80 percent by weight of 2,4-toluenediamine and 20 percent by weight of 2,6-toluenediamine.

90/100 TDA—a mixture of toluenediamine containing 90 percent by weight of an approximately 1:1 weight ratio of 2,3-toluenediamine and 3,4-toluenediamine and 10 percent by weight of 80/20 TDA.

CMDI—crude diphenylmethane diisocyanate having an average functionality of 2 to 3 prepared by the phosgenation of aniline-formaldehyde condensation products.

C—a blend of 80 percent by weight of dimethyl ethanolamine and 20 percent by weight of triethylenediamine.

BA—monofluorotrichloromethane
S—silicone surfactant
EDA—ethylenediamine
MEA—monoethanolamine
PG—propylene glycol
KOH—potassium hydroxide
EO—ethylene oxide
PO—propylene oxide

EXAMPLE 1

This example will illustrate the preparation of a heteric polyol by a one-step process. The ingredients and amounts used are provided in Table I which follows.

TABLE I

| | Parts | |
|---|---|---|
| 90/10 TDA | 16.5 | (84.0% of initiator) |
| EDA | 1.8 | (9.3% of initiator) |
| PG | 1.3 | (6.6% of initiator) |
| KOH | 0.4 | |
| EO | 32.1 | |
| PO | 48.3 | |

The molten 90/10 TDA, EDA, PG and KOH are charged to a clean, dry reactor which is purged and pressure-tested. The reactor is heated to 150° C. and the mixture of EO and PO are added at 150° C. at less than 90 psig over 5 to 6 hours. After completing the addition of the mixture of EO and PO, the reactor is stirred for 3 hours at 150° C. The reactor is then cooled to approximately 80° C. and 1.2 parts of 85% phosphoric acid are added. The reaction mixture is then stirred for about 15 minutes at 80° C. and then stripped for 1 hour at 115° C. and 10 mm mercury. The resulting polyol has a hydroxyl number of 390 and Brookfield viscosity of 4,300 cps at 25° C.

EXAMPLES 2-5

Examples 2-5 will illustrate the preparation of several polyols having an internal EO block and an external PO block by a two-step process.

In order to prepare the polyols, the molten 90/10 TDA and EDA or MEA, and KOH were charged to a clean, dry reaction vessel. The reaction vessel was heated to 125° C. while padded with dry nitrogen. EO was added and allowed to react 2 to 3 hours. After adding the EO, the PO was added to the 125° C. reaction mixture and stirred for 4 hours following the completion of the addition. The reaction mixture was then cooled to 80° C. and phosphoric acid was added in an amount sufficient to neutralize the KOH. The reaction mixture was then stirred for 15 minutes and stripped for 1 hour at 115° C. and less than 10 mm mercury. Table II which follows shows the amounts of the various ingredients used and the properties of the resulting polyol.

TABLE II

| Example | 2 | 3 | 4 | 5 |
|---|---|---|---|---|
| KOH, part | 0.17 | 0.17 | 0.17 | 0.17 |
| Initiator Mixture (i) | TDA/-MEA | TDA/-MEA | TDA/EDA | TDA/EDA |
| Initiator Weight Ratio | 98/2 | 90/10 | 98/2 | 90/10 |
| Moles EO/mole (i) | 2.4 | 2.4 | 2.4 | 2.4 |
| Moles PO/mole (i) | 3.8 | 3.6 | 3.9 | 4.0 |
| OH No. mg KOH/mg | 511 | 506 | 514 | 516 |
| Polyol Viscosity, cps at 25° C. | 41,200 | 17,200 | 49,050 | 24,500 |

EXAMPLES 6-9

Rigid polyurethane foams were prepared with the polyols of Examples 2-5. In order to prepare the foams, 100 parts of the polyol from those examples were blended with 1.5 parts of S, and 40 parts of BA. The amount of catalyst used is given in Table III which follows. The resulting resin was mixed with 130 parts of CMDI. The reactivity of the formulations and the foam properties are summarized in Table III which follows.

TABLE III

| | Example | | | |
|---|---|---|---|---|
| | 6 | 7 | 8 | 9 |
| Polyol from Example | 2 | 3 | 4 | 5 |
| Catalyst (parts) | 3.0 | 3.0 | 3.0 | 2.0 |
| Reactivity, sec. | | | | |
| Cream Time | 5 | 5 | 5 | 5 |
| Gel Time | 27 | 25 | 28 | 31 |
| Tack-Free Time | 36 | 38 | 37 | 41 |
| Rise Time | 60 | 63 | 54 | 65 |
| Physical Properties | | | | |
| Density, pcf. | 1.84 | 1.77 | 1.89 | 1.85 |
| Compressive Strength, psi | 34.2 | 29.9 | 24.7 | 33.0 |
| K-Factor | 0.120 | 0.123 | 0.120 | 0.127 |
| Friability, % wt. loss | 2.2 | 0.3 | 0.6 | 1.1 |
| Dimensional Stability, % volume change, 158° F., 100% R.H., 14 days | 5.5 | 5.2 | 3.6 | 6.3 |

COMPARISON EXAMPLE

In order to illustrate the significance of using 90/10 TDA as a co-initiator, two alkylene oxide adducts were prepared in accordance with Example 5 except that one of them was prepared with 90/10 TDA and the other was prepared with 80/20 TDA. The viscosity of the 90/10 TDA adduct was 24,500 cps at 25° C. while the viscosity of the 80/20 TDA adduct was 46,120, almost 100 percent more. This result was particularly unexpected in view of the viscosity data for adducts of 90/10 TDA and 80/20 TDA prepared in accordance with Example 5 but without co-initiating with EDA. The viscosity of the 90/10 TDA adduct was 84,000 cps while the 80/20 TDA adduct was 127,000 cps, only about 50 percent more than the 90/10 TDA adduct.

Rigid polyurethane foams were also prepared from the 90/10 TDA adduct and the 80/20 TDA adduct by following the procedure of Example 9. The viscosity data and foam data are provided in Table IV which follows.

TABLE IV

| | 90/10 TDA Adduct | 80/20 TDA Adduct |
|---|---|---|
| Reactivity, Sec. | | |
| Cream Time | 3 | 16 |
| Gel Time | 30 | 47 |
| Tack Free Time | 35 | 60 |
| Rise Time | 65 | 85 |
| Physical Properties | | |
| Density, pcf. | 1.95 | 1.90 |
| Compressive Strength, psi | 32.7 | 36.8 |
| K-Factor | 0.132 | 0.128 |
| Friability, % wt. loss | 4.23 | 2.31 |
| Dimensional Stability, % vol. change, 158° F., 100% R.H., 14 days | 11.5 | 10.5 |

The data show that although the properties of the foam for the 90/10 TDA adduct and 80/20 TDA adduct are similar, the reactivity of the 90/10 TDA adduct is faster. This makes it more suitable for laminate board and spray applications and enables the formulator to use less urethane catalyst.

The embodiments of the invention in which an exclusive property or privilege is claimed are defined as follows:

1. A polyol composition comprising the reaction product of an alkylene oxide and a mixture of initiators comprising vicinal toluenediamine and an initiator selected from the group consisting of ammonia, an aliphatic amine having a molecular weight of from 20 to 120, an alkanolamine having a molecular weight of from 50 to 120, and mixtures thereof.

2. The polyol composition of claim 1 wherein sufficient alkylene oxide is used to produce a polyol having a hydroxyl number of 300 to 600.

3. The polyol composition of claim 2 wherein the vicinal toluenediamine is a mixture consisting essentially of 90 percent by weight of an approximately 1:1 weight ratio of 2,3-toluenediamine and 3,4-toluenediamine and 10 percent by weight of a mixture of 2,4-toluenediamine and 2,6-toluenediamine.

4. The polyol composition of claim 3 wherein the alkylene oxide is selected from the group consisting of ethylene oxide, propylene oxide, and mixtures thereof.

5. The polyol composition of claim 4 wherein the aliphatic amine is ethylenediamine.

6. The polyol composition of claim 4 wherein the alkanolamine is selected from the group consisting of monoethanolamine, diethanolamine, and triethanolamine.

7. The polyol composition of claim 5 wherein the weight ratio of vicinal toluenediamine to ethylenediamine is from 5:1 to 50:1.

8. The polyol composition of claim 7 wherein the alkylene oxide is added in two steps such that from 1–5 moles of ethylene oxide are added in the first step per mole of initiator and from 1–5 moles of propylene oxide are added in the second step, with the proviso that the total amount of alkylene oxide added is such that the polyol composition will have a hydroxyl number of 400 to 550.

9. The polyol composition of claim 7 wherein a diol is used as an initiator in addition to vicinal toluenediamine and aliphatic amine.

10. The polyol composition of claim 9 wherein the diol is propylene glycol.

11. The polyol composition of claim 10 wherein the weight ratio of propylene glycol to ethylenediamine is from 3:1 to 1:3.

12. The polyol composition of claim 11 wherein the alkylene oxide is a mixture of ethylene oxide and propylene oxide with the proviso that sufficient alkylene oxide is used to produce a polyol having a hydroxyl number of 350–450.

13. The polyol composition of claim 12 wherein the weight ratio of ethylene oxide to propylene oxide is from 3:1 to 1:3.

14. A process for preparing a polyol composition comprising reacting an alkylene oxide and a mixture of initiators comprising vicinal toluenediamine and an initiator selected from the group consisting of ammonia, an aliphatic amine having a molecular weight of from 20 to 120, an alkanolamine having a molecular weight of from 50 to 120, and mixtures thereof.

15. The process of claim 14 wherein sufficient alkylene oxide is used to produce a polyol having a hydroxyl number of 300 to 600.

16. The process of claim 15 wherein the vicinal toluenediamine is a mixture consisting essentially of 90 percent by weight of an approximately 1:1 weight ratio of 2,3-toluenediamine and 3,4-toluenediamine and 10 percent by weight of a mixture of 2,4-toluenediamine and 2,6-toluenediamine.

17. The process of claim 16 wherein the alkylene oxide is selected from the group consisting of ethylene oxide, propylene oxide, and mixtures thereof.

18. The process of claim 17 wherein the aliphatic amine is ethylenediamine.

19. The process of claim 17 wherein the alkanolamine is selected from the group consisting of monoethanolamine, diethanolamine, and triethanolamine.

20. The process of claim 18 wherein the weight ratio of vicinal toluenediamine to ethylenediamine is from 5:1 to 50:1.

21. The process of claim 20 wherein the alkylene oxide is added in two steps such that from 1 to 5 moles of ethylene oxide are added in the first step per mole of initiator and from 1 to 5 moles of propylene oxide are added in the second step, with the proviso that the total amount of alkylene oxide added is such that the polyol composition will have a hydroxyl number of 450 to 550.

22. The polyol composition of claim 20 wherein a diol is used as an initiator in addition to vicinal toluenediamine and aliphatic amine.

23. The polyol composition of claim 22 wherein the diol is propylene glycol.

24. The process of claim 23 wherein the weight ratio of propylene glycol to ethylenediamine is from 3:1 to 1:3.

25. The process of claim 24 wherein the alkylene oxide is a mixture of ethylene oxide and propylene oxide with the proviso that sufficient alkylene oxide is used to produce a polyol having a hydroxyl number of 350 to 450.

26. The process of claim 25 wherein the weight ratio of ethylene oxide is from 3:1 to 1:3.

27. A polyurethane foam comprising the reaction product of an organic polyisocyanate, the polyol composition of claims 1, 2, 3, 4, 5, 6, 7, 8, 9, 10, 11, 12, or 13, and a blowing agent wherein the ratio of isocyanate groups of the organic polyisocyanate to active hydrogen atoms of the polyol composition is from 1:0.9 to 1:1.15.

* * * * *